United States Patent [19]

Coffinberry et al.

[11] 4,041,697
[45] Aug. 16, 1977

[54] OIL COOLING SYSTEM FOR A GAS TURBINE ENGINE

[75] Inventors: George A. Coffinberry, Cincinnati; Howard B. Kast, Fairfield, both of Ohio

[73] Assignee: The United States of America as represented by the Administrator of the National Aeronautics and Space Administration, Washington, D.C.

[21] Appl. No.: 596,641

[22] Filed: July 17, 1975

[51] Int. Cl.² ............................................. F02C 9/08
[52] U.S. Cl. ............................ 60/39.28 R; 60/39.66; 415/180; 123/41.33; 123/122 E; 137/104
[58] Field of Search ................ 60/39.28 R, 39.28 T, 60/39.66, 39.02, 39.03; 123/122 E, 41.33, 41.02, 41.01; 415/175, 180

[56] References Cited

U.S. PATENT DOCUMENTS

| | | | |
|---|---|---|---|
| 2,865,580 | 12/1958 | Marshall | 60/39.66 |
| 2,925,712 | 2/1960 | Johnson | 60/39.66 X |
| 2,979,293 | 4/1961 | Mount | 60/39.66 X |
| 3,080,716 | 3/1963 | Cummings | 60/39.66 |
| 3,307,355 | 3/1967 | Bahr | 60/39.28 R |
| 3,420,055 | 1/1969 | Lavash | 60/39.28 R |
| 3,627,239 | 12/1971 | Hull | 60/39.28 R |
| 3,658,249 | 4/1972 | Sharpe | 60/39.28 R |
| 3,733,816 | 5/1973 | Nash | 60/39.28 R |
| 3,779,007 | 12/1973 | Lavash | 60/39.28 R |
| 3,874,168 | 4/1975 | Toure | 60/39.28 R |

*Primary Examiner*—Clarence R. Gordon
*Attorney, Agent, or Firm*—Robert C. Lampe, Jr.; Drek P. Lawrence; Norman T. Musial

[57] ABSTRACT

A gas turbine engine fuel delivery and control system is provided with means to recirculate all fuel in excess of fuel control requirements back to the aircraft fuel tank, thereby increasing the fuel pump heat sink and decreasing the pump temperature rise without the addition of valving other than that normally employed. A fuel/oil heat exchanger and associated circuitry is provided to maintain the hot engine oil in heat exchange relationship with the cool engine fuel. Where anti-icing of the fuel filter is required, means are provided to maintain the fuel temperature entering the filter at or above a minimum level to prevent freezing thereof. In one embodiment, a divider valve is provided to take all excess fuel from either upstream or downstream of the fuel filter and route it back to the tanks, the ratio of upstream to downstream extraction being a function of fuel pump discharge pressure. In addition, fluid circuitry is provided to route hot engine oil through a plurality of heat exchangers disposed within the system to provide for selective cooling of the oil.

21 Claims, 9 Drawing Figures

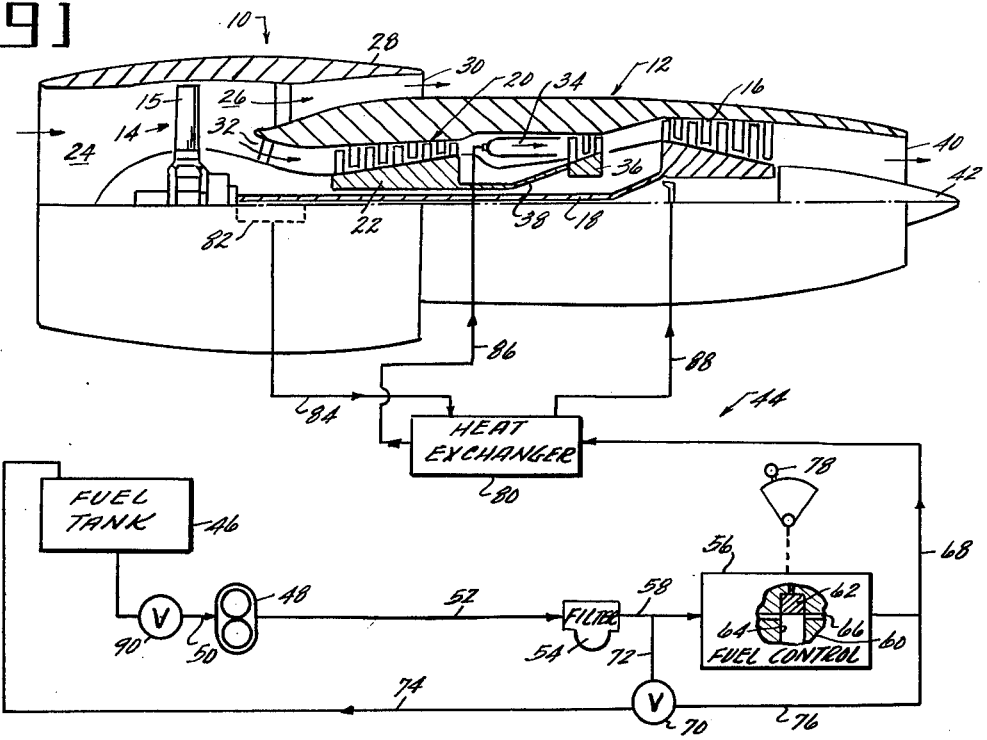
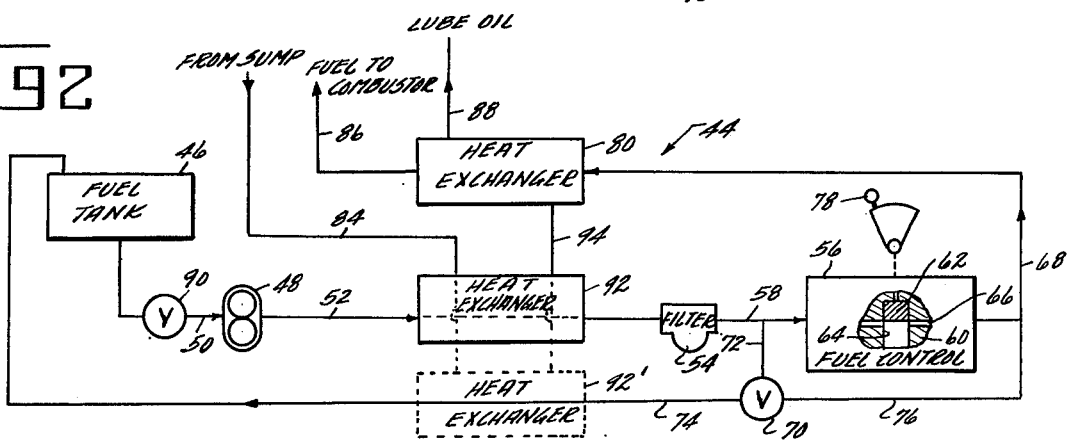
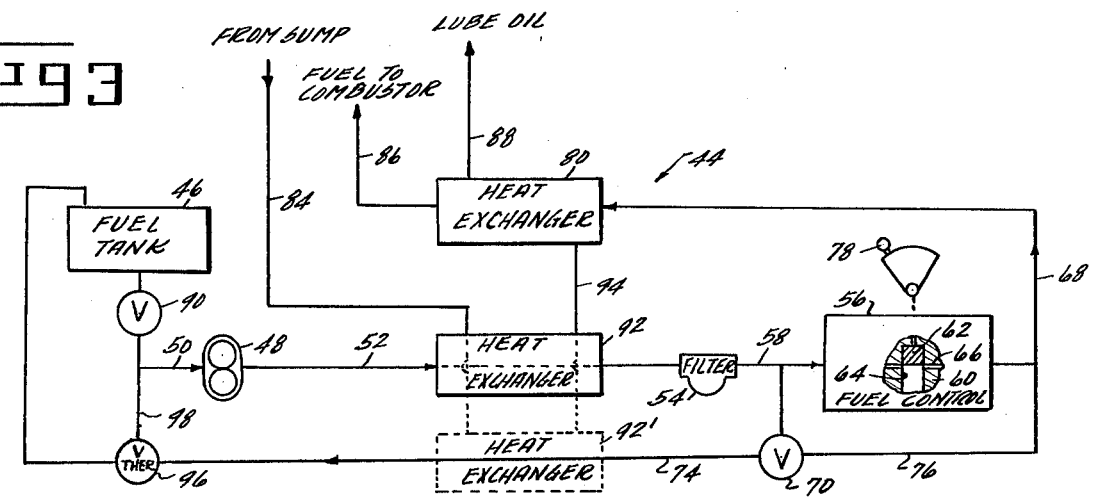

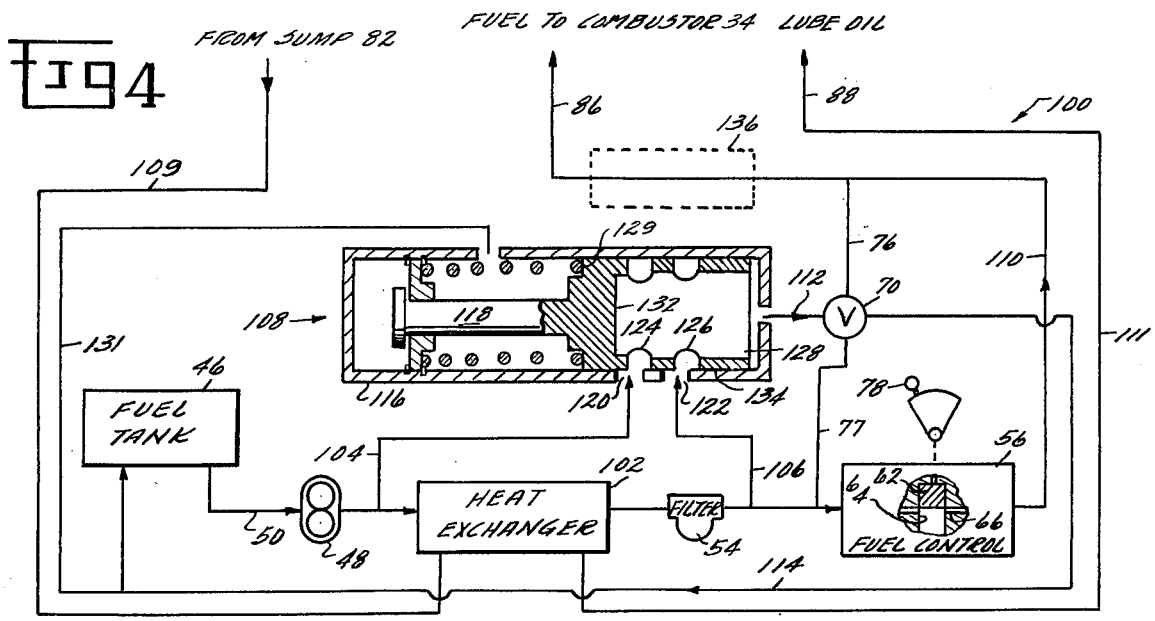

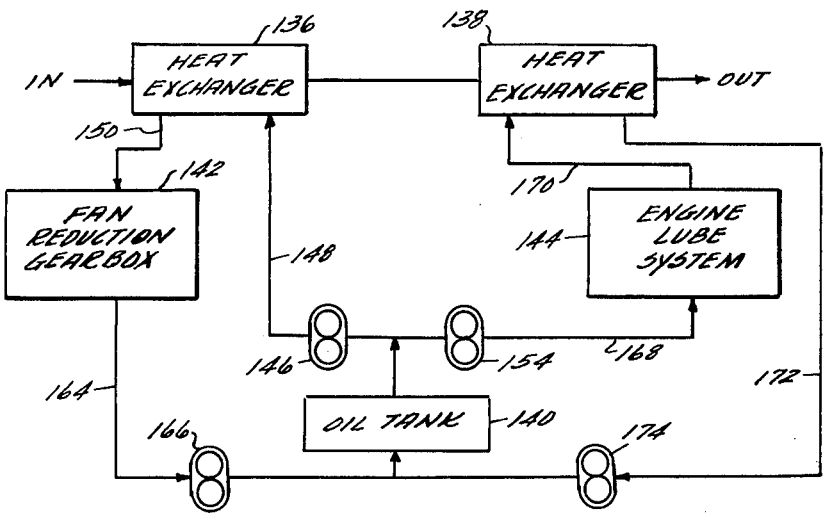
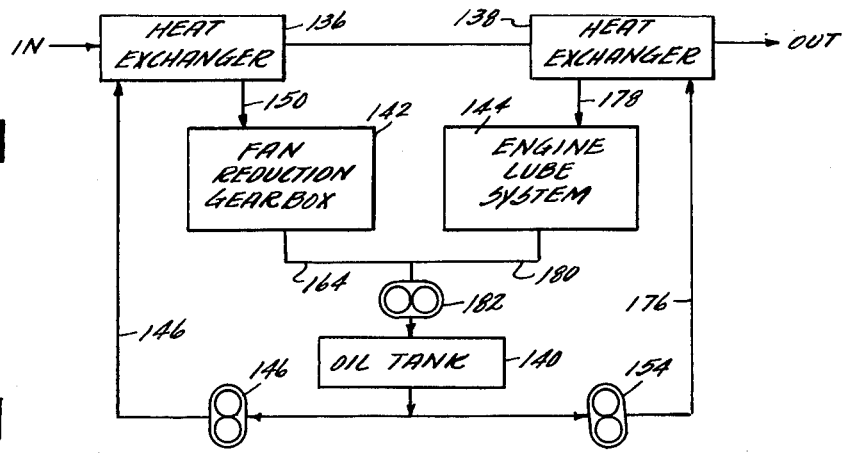
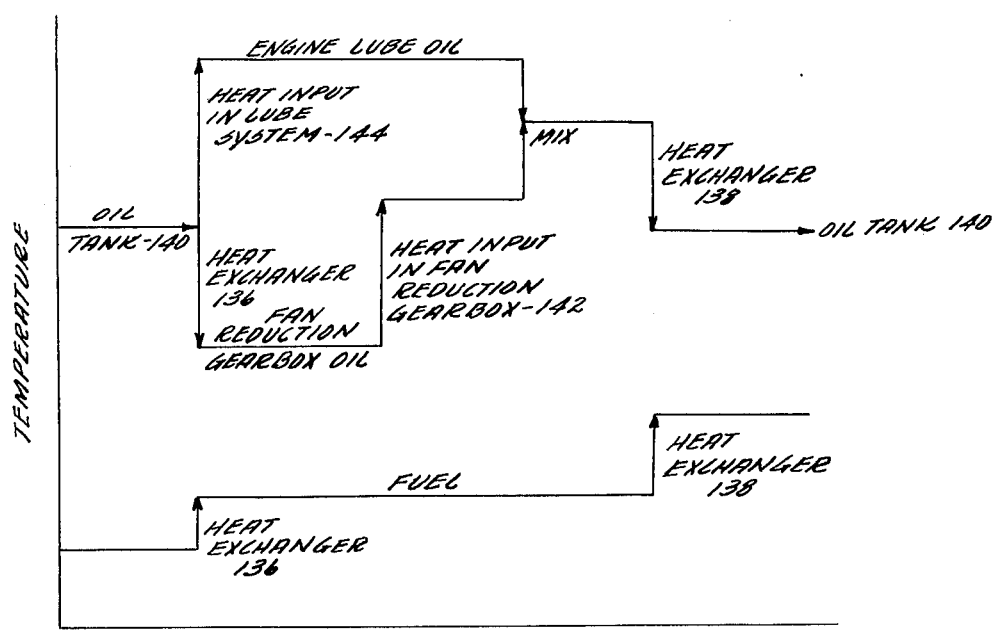

OIL COOLING SYSTEM FOR A GAS TURBINE ENGINE

The invention herein described was made in the performance of work under a NASA contract and is subject to the provision of Section 305 of the National Aeronautics and Space Act of 1958, Public Law 85-568 (72 Stat. 435; 42 USC 2457).

BACKGROUND OF THE INVENTION

This invention relates to fuel delivery and control systems for gas turbine engines and, more particularly, to fuel delivery and control systems having the additional capability of utilizing the engine fuel as a heat sink for the engine lubrication system.

Future generations of gas turbine engines will introduce engine control requirements more complex than heretofore experienced. The introduction of variable pitch and other geared fans on gas turbine engines will compound the already difficult task of engine lubrication and, in particular, of lubricant cooling.

The basic problem in gas turbine engine oil cooling is to cool the hot oil scavenged from the various oil sumps to a temperature low enough such that engine parts can dissipate their heat to a relatively cooler oil to avoid exceeding their individual design temperature limits. It is desirable to use the engine metered (consumed) fuel as a heat sink for the oil so that thermal energy is returned to the engine cycle and to avoid the costly installation and vulnerability penalties of oil-to-air coolers.

Typically, gas turbine engines have difficulty in obtaining a low temperature heat sink at reduced power settings due to the reduced metered flow rates through the engine fuel control. Consider the typical fuel delivery and control system for modern engines: generally it comprises a fuel pump, driven by the gas turbine engine rotor, which pressurizes a flow of fuel for delivery to a fuel control. The fuel control includes a metering valve for scheduling the flow of fuel to a series of fuel nozzles for injection into a combustor as a function of predetermined control parameters. A fuel/oil heat exchanger is generally included downstream of the fuel control to cool the hot engine oil while preheating fuel delivered to the fuel nozzles. This results in a heat exchanger fuel inlet temperature which equals the sum of the engine fuel pump inlet temperature and the temperature rise across the pump. The pump temperature rise typically varies from 10° to 100° F (for take-off and idle conditions, respectively) and all of this heat must be dissipated into the metered fuel.

Further compounding the problem is that the fuel pump is designed to function essentially as a constant displacement pump over the flight envelope and to produce an excess fuel output for all but brief periods such as during engine start. As the fuel requirements of the engine decrease and less fuel is metered through the fuel control, the back pressure on the fuel pump decreases. A pressure regulating valve of the flow bypass variety maintains a constant pressure differential across the fuel control metering valve. Since the fuel pump flow exceeds the level necessary to sustain the engine, the pressure regulating valve opens, as necessary, to bypass the excess pump discharge flow to a low pressure point, typically the pump inlet. As a portion of the fuel recirculates again through the fuel pump, its temperature is further increased in cumulative fashion, as a result of the input of pump work and throttling through the pressure regulating valve, such that the temperature of the fuel at the heat exchanger inlet can be well in excess of 200° F prior to any addition of lube oil heat. Since, after cooling, the required oil temperature must be in the range of approximately 180° to 300° F (depending on operating conditions), the fuel pump temperature rise is a major problem for effective oil cooling.

Furthermore, it is usually found necessary to incorporate at least one fuel filter ahead of the fuel control to filter out contaminants from the intricate control mechanisms. While it becomes desirable, in theory, to reduce the temperature of the fuel entering the heat exchanger as previously discussed, care must be taken to keep the fuel temperature above 32° F in order to prevent freezing of water particles in the filter with subsequent fuel blockage. Thus, in the absence of anti-icing inhibitors in the fuel, a fuel/oil cooling scheme should include provisions for maintaining the fuel temperature entering the filter at a temperature above 32° F.

Additionally, the introduction of variable pitch and other geared fans to gas turbine engines results in gearboxes which must transmit considerable horsepower, consequently requiring large gears and high gear loads. The gear scoring factor (temperature rise above bulk oil temperature) for such an engine might well be in the order of 120° F. So as not to exceed the gear limiting temperatures, it is necessary to cool the bulk oil to a temperature considerably below that normally acceptable for other gas turbine engines. For example, the reduction gear supply oil temperature may be 180° F while the main engine oil supply requirement is less stringent at approximately 300° F. If all of the engine oil (reduction gearbox plus main engine) must be cooled to the lower value (i.e., 180° F), considerable difficulty is encountered since there is insufficient fuel heat sink (i.e., cold fuel) available. The problems is to selectively cool the oil such that the main engine lubrication system can operate at a higher, yet still effective, oil temperature than the reduction gearbox.

SUMMARY OF THE INVENTION

Accordingly, it is the primary object of this invention to provide an improved fuel delivery and control system for a gas turbine engine which reduces the fuel inlet temperature to the heat exchange wherein engine fuel is maintained in heat exchange relationship with hot engine oil.

It is another object of the present invention to provide an improved fuel delivery and control system wherein the engine oil is selectively cooled by the fuel such that oil received by each engine component is at a temperature consistent with its optimum operating condition.

It is yet another object of the present invention to provide an improved fuel delivery and control system which maintains the fuel temperature at a level greater than 32° F entering the fuel filter.

These and other objects and advantages will be more clearly understood from the following detailed description, drawings and specific examples, all of which are intended to be typical of rather than in any way limiting on the scope of the present invention.

Briefly stated, the above objectives are accomplished by permitting the fuel pump to recirculate all fuel in excess of engine requirements back to the aircraft fuel tanks rather than to the inlet of the high pressure pumping element. The immediate effect of such an arrangement is to increase the pump heat sink and decrease the pump temperature rise in proportion to the ratio of pump total flow to metered flow without the addition of valving other than that normally employed. Thus, the fuel temperature entering any fuel/oil heat exchanger downstream of the pump is at a reduced level. Several alternative embodiments of heat exchanger locations are presented depending upon the oil heat load required to be dissipated.

Where anti-icing of the fuel filter is required, means are provided to maintain the temperature of the fuel entering the filter at or above a minimum level. In one embodiment, a thermal valve schedules a decreasing rate of excess fuel flow back to the fuel tanks as a function of decreasing pump discharge temperature, the remainder being routed to the pump inlet. In another embodiment, a divider valve is provided to take al fuel in excess of the engine requirements from upstream, or downstream, of the fuel filter and route it back to the fuel tanks. The divider valve schedules the relationship of upstream-to-downstream fuel extraction such as to maintain a minimum temperature level for the fuel entering the fuel filter and to avoid overheating in the fuel tank. In addition, fluid circuitry is provided to route hot engine oil through a plurality of heat exchangers uniquely disposed within the system to provide for selective cooling of the oil.

DESCRIPTION OF THE DRAWINGS

While the specification concludes with claims particularly pointing out and distinctly claiming the subject matter which is regarded as part of the present invention, it is believed that the invention will be more clearly understood from the following description of the preferred embodiment which is given by way of example with the accompanying drawings in which:

FIG. 1 is a schematic view showing the fuel delivery and control system of the present invention in combination with a gas turbine engine;

FIG. 2 is a schematic view, similar to FIG. 1, of an alternative embodiment showing the addition of optional heat exchangers;

FIG. 3 is a schematic view, similar to FIG. 2, of another alternative embodiment of the present invention incorporating a thermal valve;

FIG. 4 is a schematic view, similar to FIG. 1, of an embodiment of the present invention incorporating a divider valve;

FIG. 5 is a graphical representation of a bypass flow ratio through the divider valve of FIG. 4 as a function of fuel pump discharge pressure;

FIGS. 6 through 8 depict schematically alternative embodiments of a portion of the fuel delivery and control system of FIG. 4 wherein selective oil cooling has been incorporated; and FIG. 9 is a graphical representation of the oil and fuel temperature levels in various portions of the fuel delivery and control system of FIG. 6.

DESCRIPTION OF THE PREFERRED EMBODIMENT

Referring to the drawings wherein like numerals correspond to like elements throughout, reference is first directed to FIG. 1 wherein an engine depicted generally at 10 embodying the present invention is diagrammatically shown. This engine may be considered as comprising generally a core engine 12, a fan assembly 14 including a stage of fan blades 15, and a fan turbine 16 which is interconnected to the fan assembly 14 by shaft 18. The core engine 12 includes an axial flow compressor 20 having a rotor 22. Air enters inlet 24 and is initially compressed by fan assembly 14. A first portion of this compressed air enters the fan bypass duct 26 defined, in part, by core engine 12 and a circumscribing fan nacelle 28 and discharges through a fan nozzle 30. A second portion of the compressed air enters inlet 32, is further compressed by the axial flow compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass to and drive the fan turbine 16 which, in turn, drives the fan assembly 14. A propulsive force is thus obtained by the action of the fan assembly 14 discharging air from the fan bypass duct 26 through the fan nozzle 30 and by the discharge of combustion gases from a core engine nozzle 40 defined, in part, by plug 42. The above description is typical of many present-day gas turbine engines and is not meant to be limiting, as it will become readily apparent from the following description that the present invention is capable of application to any gas turbine engine is not necessarily restricted to gas turbine engines of the turbofan variety. The foregoing description of the operation of the engine depicted in FIG. 1, is therefore, merely meant to be illustrative of one type of application.

Continuing with FIG. 1, there is shown schematically the fuel delivery and control system, designated generally at 44, which comprises a portion of the subject of the present invention. In the fuel delivery and control system, a fuel reservoir 46, typically an aircraft fuel tank, supplies gas turbine engine fuel to a main fuel pump 48 by way of conduit 50. The main fuel pump is generally a gear or vane pump driven by core engine 12 and may be considered to be of the constant displacement variety. Pressurized fuel from the pump 48 then passes through conduit 52 to fuel filter 54 which serves to screen particulate matter from the fuel prior to its entering main fuel control 56 by conduit 58.

The main fuel control 56 includes a metering valve 60 for scheduling the flow of fuel to the engine combustor 34. The metering valve comprises a piston 62 displaceable in bore 64. The piston cooperates with an outlet port 66 to form a variable area orifice for passage of fuel from the metering valve to a conduit 68.

Pressure regulating bypass valve 70 is adapted to bypass excess pressurized fuel from conudit 58 through conduits 72 and 74 back to the fuel tank 46 whenever the differential pressure across the metering valve 60 exceeds a predetermined value as sensed through conduits 72 and 76, conduit 76 serving solely as a sensing line. Thus, a constant pressure differential is maintained across the metering valve 60 which causes the flow metered thereby to be directly proportional to the area of the orifice formed by the piston 62 and the outlet port 66. The piston 62 is controlled primarily as a function of the position of pilot control lever 76. Additionally control inputs reflecting selected engine operating parameters such as speed, temperature, and pressure are fed into fuel control 56 for control of the metering valve piston 62 so that the flow of fuel to the engine provides optimum engine performance. Thus, all fuel discharged from pump 48 in excess of the fuel control requirements is returned to the fuel tank 46. The metered pressurized fuel is directed conduit 68 to a fuel/oil heat exchanger 80. The fuel/oil heat exchanger 80 receives hot engine oil collected in a typical engine sump 82 and delivered through conduit 84. The relatively cool metered fuel flows through the exchanger 80 in heat exchange relation with the oil whereupon the heated fuel discharges through conduit 86 to combustor 34 wherein it is burned in the usual manner of a gas turbine engine. The cooled oil discharges from the heat exchanger through a communicating conduit 88 back to the engine for lubrication purposes. As previously discussed, one of the basic problems in gas turbine engine cooling is the difficulty in obtaining a low temperature fuel sink at low power setting due to the low meter fuel flow rates. The present invention overcomes this problem by providing a simple means for reducing the pump temperature rise by permitting the pump to recirculate its excess flow (excessive to fuel control requirements) back to the aircraft fuel tanks rather than back to the inlet of the high pressure pump as it typical of the prior art. The effect is to increase the pump heat sink and decrease the pump temperature rise in proportion to the ratio of pump total flow to metered flow. The effect of the present invention is that, for example, where previously there was a 100° F temperature increase across pump 48 at idle power setting, the present invention reduces the temperature rise to 4° F, a benefit of 25:1. The benefits at take-off power settings are less, but still approximately 3:1. In effect, with the subject fuel delivery and control system, the heat exchanger fuel inlet temperature can be made to be less than 5° F above fuel pump inlet temperature at all operating conditions.

The heat input to the aircraft fuel tank 46 due to the recirculation is the sum of the throttling heat due to pressure drop from fuel control pressure to tank pressure and a portion of the pump heat rise (determined by the ratio of recirculation flow to metered flow). In total, the fuel tank heat input is low and can be dissipated to ambient by heat transfer through the tank walls and wing surfaces. Fuel tank temperature should not increase as a result of fuel pump heat input even at low levels of fuel reserve. Although an additional fuel line (conduit 74) is required between an aircraft and engine, line size can be made relatively small since line pressure drop is not critical with respect to recirculation fuel as is the case for the engine fuel supply line. The pump fuel flow is terminated by closure of the fuel supply emergency shut off 90 which may be pilot-actuated by means not shown.

FIG. 2 depicts an alternative embodiment of the fuel delivery and control system of FIG. 1 wherein the heat load capability of the fuel system has been improved. Where, in the configuration of FIG. 1, the heat exchanger 80 is insufficient to remove all of the necessary heat from the oil, a second fuel/oil heat exchanger 92 (FIG. 2) has been added in upstream serial oil flow relationship with the heat exchanger 80. While heat exchanger 92 is located within conduit 52, between pump 48 and filter 54, it may be preferable to locate it in the return conduit 74 as indicated in phantom (92') (Further, there is possibility of locating one heat exchanger in each position with a thermal valve, not shown, to switch modes.) Either way, the hot oil enters heat exchanger 92 through conduit 84, flows serially (through conduit 94) to heat exchanger 80 and thereafter to engine 10 through conduit 88. The oil heat heat loss experienced in heat exchanger 92 is at least partially dissipated in the fuel tank 46, and is totally dissipated therein when the heat exchanger is placed as in phantom in conduit 74.

Although placing a heat exchanger ahead of the fuel filter 54 will tend to discourage formation of ice therein, it is anticipated that in some applications further means must be provided to maintain the temperature of the fuel entering the filter at a minimum level. To that end, and in accordance with an objective of the present invention, a thermal control valve 96 (FIG. 3) is provided to direct the excess fuel to the fuel tank 46 or through conduit 98 to the inlet of pump 48. The thermal control valve 96 is adapted to schedule a decreasing rate of fuel to the fuel tank 46 as a function of decreasing pump discharge (hence, filter discharge) temperature, the remainder being routed to the inlet of pump 48. Thus, only so much of the excess fuel as is needed to prevent filter icing is recirculated through the pump, thereby cumulating the effect of the pump temperature rise.

FIG. 4 schematically depicts another embodiment of a fuel delivery and control system 100 which offers unique advantages in oil cooling and ice protection. In the manner of the previous embodiment, fuel from tank 46 is delivered through conduit 50 to the positive displacement pump 48. From the pump, fuel at high pressure flows to a fuel/oil heat exchanger 102 and also through conduits 104 and 106 to a divider valve 108 which may be incorporated within the fuel control 56 but which is separated therefrom in FIG. 4 for simplicity of explanation. Heated oil flows from sump 82 to the heat exchanger through conduit 109 and the cooled oil returns to the engine through conduit 11.

At least a portion of the pressurized fuel passes through the fuel/oil heat exchanger 102 and filter 54 to fuel control 56 wherein the metering valve 60 controls the fuel rate to the engine through conduit 110. Pressure regulating bypass valve 70 is adapted to bypass excess pressurized fuel from the pump 48 through conduits 112 and 114 back to fuel tank 46, as in the previous embodiments, depending upon the pressure differential across the metering valve 60 as sensed by sensing conduits 76 and 77. However, unlike the previous embodiments, the excess flow must pass through a unique divider valve 108 which is adapted to receive the flow from both upstream (conduit 104) and downstream (conduit 106) of the heat exchanger 102 and fuel filter 54. The function of the divider valve is to pass a portion of the bypass filter through the heat exchanger and fuel filter at an intermediate range of pump discharge pressure corresponding to cruise and descent engine power settings, permitting a portion of the engine oil heat load to be dissipated in the fuel tank 46 at a flight condition wherein heat can be effectively removed through the wing surfaces. At high and low pump discharge pressures, which correspond to take-off and ground idle power settings, the divider valve routes all of the excess fuel flow from ahead of the heat exchanger back to the fuel tank which functions as a heat sink for only the small amount of heat input due to pump work and bypass fuel throttling.

In particular, divider valve 108 includes a housing 116 receiving a spring biased valve 118. Conduits 104 and 106 communicate with the interior of housing 116 through apertures 120 and 122, respectively. Slots 124 and 126 cooperate with apertures 120 and 122, respectively, to form variable area orifices for passage of fuel from the conduits 104 and 106 into the divider valve plenum 128. The apertures and slots are so arranged that when valve 118 is at full aft displacement (to the left in FIG. 4) and at its full forward displacement, aperture 122 is substantially closed and aperture 120 is open. At intermediate positions of valve 118 the orifices split the flow from conduits 104 and 106 as a function of fuel pressure level (at pump discharge) which, in turn, is a function of engine thrust level (power setting).

At the low pump discharge pressure, spring 130 holds the valve to the right by exerting a force upon shoulder 129 so that the upstream aperture 120 sensing pump discharge pressure is open and the downstream aperture 122 is substantially closed. Conduit 131 is merely a sensing line communicating with the low pressure in the fuel tank 46. Referring fo FIG. 5 wherein bypass flow ratio (which is defined as the ratio of flow passing through the upstream aperture 120 to the total bypass flow passing through the conduit 114) is plotted as a function of pump discharge pressure, it is apparent that substantially all of the excess flow passes through aperture 120 at low and high main fuel pump discharge pressures. As the pump discharge pressure rises with increasing engine power setting, valve 118 is forced to move to the left (due to the fuel pressure upon valve face 132) reducing flow through aperture 120 and opening aperture 122 such that the bypass flow ratio is reduced. When the valve has moved completely to the left, aperture 122 is substantially blocked by land 134 such that all of the excess flow passes again through aperture 120. The apertures and slots can be shaped to give the desired bypass flow ratio as a function of pump discharge pressure depending upon engine requirements. The approach is reliable because the divider valve never blocks flow to the bypass valve 70; it only changes the area ratios of the two flow paths including conduits 104 and 106.

With this approach, fuel filter ice protection is maximized because essentially only metered flow passes through the heat exchanger and filter at low and high pump discharge pressure (and flow rates), thus obtaining maximum fuel temperature rise for a given oil temperature (heat load). Hence, there is no engine lubrication heat returned to the fuel tank 46 at this condition. At intermediate pump pressure levels, corresponding to engine cruise and descent power settings, a regulated amount of fuel from downstream of the engine heat exchanger 102 is permitted to enter the divider valve 108 where it mixes with upstream fuel and then flows to the bypass valve 70 and back to the fuel tank 46, in theory much like the configuration of FIG. 2. The divider valve permits a portion of the engine lube oil heat to be returned to the fuel tank 46 during those conditions where the metered fuel sink is insufficient to provide the necessary oil cooling. At extremely high power settings, such as take-off, when pump discharge pressures are maximum, the divider valve again allows only the flow upstream of the heat exchanger to be diverted back to the fuel tanks. The logic is that typically the aircraft fuel tanks are located in the wings and the flow of ambient air over the wings during flight will allow for dissipation of the heat in fuel returned to the tanks. However, high power settings are associated with take-off conditions where the flow of air over the wings is at a minimum, and thus heat transfer capability is low. To avoid overheating the fuel tanks, the excess flow is taken from the pump discharge upstream of the heat exchanger. It is understood that if overheating within the tanks is not a severe problem, this feature of the divider valve could be eliminated without departing from the intent of the present invention.

Thus, a reliable fuel delivery and control system has been presented which is not dependent upon intricate thermal valve and which optimize the fuel/oil heat exchanger and anti-icing requirements. Furthermore, provision is available for an additional heat exchanger 136 (in phantom) for other aircraft accessories which require cooling.

Referring now to FIGS. 6 through 8, there is disclosed therein schemes by which engine lubrication oil may be selectively cooled to match the requirements of various zones of the engine. Typically, in gas turbine engines employing fan speed reduction gearboxes, the gearbox transmits considerable horsepower, consequently requiring large gears and high gear loads. In a typical installation, the gear scoring factor (temperature rise above bulk oil temperature) is in the order of 120° F. This is considerably higher than the scoring factor experienced elsewhere in the engine gearing. So as not to exceed the gear material limiting temperature (for example, 300° F), it is normally necessary to cool the bulk oil to a temperature cnsistent with the highest expected temperature rise (here the gearbox), which is considerably below that otherwise acceptable. For example, the reduction oil gear supply may have to be 180° F while the main engine oil supply may be approximately 300° F. If all of the engine oil must be cooled to the lower value, considerable difficulty is encountered since there is insufficient heat sink (low temperature fuel) available. The solution is to cool the two oil systems selectively and allow the main engine oil to operate at a higher oil temperature than that supplied to the reduction gearbox.

In the system of FIG. 6, heat exchangers 136 and 138 have been placed in fuel serial flow relationship in place of heat exchanger 102 of FIG. 4, for example. Cool oil from a single oil tank or oil sump 140 supplies oil to two separate lubrication systems 142 and 144. Assuming system 142 to represent the aforementioned fan reduction gearbox, cool oil is pumped by means of pump 146 through conduit 148 to heat exchanger 136. Since heat exchanger 136 receives the coldest available fuel, oil exiting through conduit 150 is the coldest oil in the entire system. This cold oil then lubricates the gearbox 142 and is scavenged by representaive conduit 152.

Other cool oil is pumped by means of pump 154 (which may be combined with pump 146) through conduit 156 to the second lubrication system 144. Scavenged oil from lube system 144 then mixes with the oil scavenged from gearbox 142 and is pumped by means of scavenge pump 158 through conduit 160 (which carries the hottest oil in the entire system) to the engine heat exchanger 138. Therein the heated oil is cooled and returned through conduit 162 to the oil tank or sump 140 to repeat the cycle. FIG. 9 depicts graphically the changes in temperature of the oil and fuel as they pass through the various components.

In the alternative embodiment of FIG. 7, oil passes through the first heat exchanger 136 and the fan reduction gearbox 142 much in the manner of the previous embodiment such that the coolest oil in the system exists in conduit 150. Thereafter, it is returned to the oil tank 140 through conduit 164 and scavenge pump 166. Other oil at oil tank temperature passes serially through lube system 144 and heat exchanger 138 by means of conduit 168 and 170, returning to the oil tank through conduit 172 and scavenge pump 174 (which may be integral with pump 166).

Alternatively, as shown in FIG. 8, the cooling circuit for engine lube system 144 could be configured with the engine lube system downstream of the heat exchanger 138. Thus, the circuit comprises, in serial flow relationship, the oil tank 140 from which oil is drawn by pump 154, conduit 176, heat exchanger 138, conduit 178, engine lube system 144, conduit 180 and scavenge pump 182 for return of the oil to the oil tank.

It should be obvious to one skilled in the art that certain changes can be made to the above-described invention without departing from the broad inventive concepts thereof. For example, though the above-described invention has been described with respect to a gas turbofan engine, it is equally applicable to any gas turbine engine, with or without a fan. Furthermore, though the preferred embodiments depict two zone (or two circuit) oil cooling, the invention may be adapted to cool oil to more than two temperature levels through the incorporation of additional heat exchangers and associated plumbing.

Having thus described the invention, what is considered as novel and desired to be secured by Letters Patent of the United States is:

1. A fuel delivery and control system for use with a gas turbine engine and a fuel reservoir, said system comprising:
   pump means communicating with the fuel reservoir for drawing fuel therefrom and pressurizing same;
   a fuel control in downstream flow communication with the pump means for receiving fuel therefrom, said fuel control including metering means for scheduling the rate of fuel flow to the engine;
   a first heat exchanger for receiving all of the metered fuel and further communicating with the gas turbine engine for receipt of hot engine oil therefrom, wherein the hot engine oil is maintained in heat exchange relation with the fuel and then returned to the engine at a cooler temperature; and
   means for reducing the fuel temperature to the inlet of the first heat exchanger by returning all fuel in excess of engine requirements back to the fuel reservoir.

2. The fuel delivery and control system of claim 1 wherein the fuel temperature reducing means includes a bypass valve for returning the excess pressurized fuel to the fuel reservoir whenever the flow upstream of the metering means exceeds the flow required by the engine.

3. The fuel delivery and control system of claim 2 further comprising combustor means downstream of the fuel control and first heat exchanger.

4. The fuel delivery and control system of claim 2 further comprising a second heat exchanger downstream of the pump means such that all of the fuel discharged from the pump means passes through the second heat exchanger and all of the metered fuel passes through the first heat exchanger.

5. The fuel delivery and control system of claim 4 wherein the hot engine oil is adapted to pass serially through the second heat exchanger and then the first heat exchanger.

6. The fuel delivery and control system of claim 2 further comprising a second heat exchanger for receiving the pressurized fuel in excess of the metered fuel.

7. The fuel delivery and control system of claim 6 where the hot engine oil is adapted to pass serially through the second heat exchanger and then the first heat exchanger.

8. The fuel delivery and control means of claim 2 further comprising filter means for filtering matter from the fuel entering the metering means.

9. The fuel delivery and control system of claim 4 further comprising fuel filter means disposed in serial flow communication between the second heat exchanger and the metering means.

10. A fuel delivery and control system for use with a gas turbine engine and a fuel reservoir, said system comprising:
    pump means for drawing fuel from the reservoir and pressurizing means;
    a first heat exchanger in downstream fuel flow communication with said pump means for receiving at least a portion of the pressurized fuel therefrom and further communicating with a source of hot fluid which is maintained in heat exchange relationship with the fuel;
    a fuel control in downstream fuel flow communication with said first heat exchanger for receiving at least a portion of the pressurized fuel therefrom, said fuel control including metering means for scheduling the rate of fuel flow of the engine;
    means for filtering particulate matter from that portion of the pressurized fuel passing through said first heat exchanger;
    by pass valve means responsive to the engine fuel requirements for returning pressurized fuel in excess of engine requirements back to the fuel reservoir whenever the fuel flow upstream of the metering means exceeds the engine requirements; and
    divider valve means for receiving the excess pressurized fuel from two locations, one location being upstream of said first heat exchanger and filter means, and the other being downstream of said first heat exchanger and filter means, and for discharging the fuel through the bypass valve means.

11. The fuel delivery and control system of claim 10 wherein th bypass valve means is so constructed that the ratio of fuel received from the one upstream location to that passing through the bypass valve means is scheduled such that the amount of heat transferred to the fuel reservoir is less than or equal to the amount of heat that can be dissipated by the fuel reservoir and the temperature of the fuel entering the filter means is maintained above a minimum temperature to eliminate ice formation therein.

12. The fuel delivery and control system of claim 11 wherein the bypass valve means is further characterized in its construction such that the fuel flow from the other downstream location is scheduled to be substantially zero at the engine take-off and ground idle power settings and to be a positive value at power settings therebetween.

13. A fuel delivery and control system for use with a gas turbine engine and a fuel reservoir, said system comprising:
    pump means communicating with the fuel reservoir for drawing fuel therefrom and pressurizing same;
    a fuel control in downstream flow communication with the pump means for receiving fuel therefrom and including metering means for scheduling the rate of fuel flow to the engine;
    heat exchange means for receiving at least a portion of the pressurized fuel and further communicating with the gas turbine engine for receipt of hot engine oil therefrom, wherein the hot engine oil is maintained in heat exchange relation with the fuel and then returned to the engine at a cooler temperature;

means for filtering particulate matter from the fuel entering the metering means; and means for maintaining the temperature of the fuel entering the filter means above a minimum level.

14. The fuel delivery and control system of claim 13 wherein the fuel temperature maintaining means includes a bypass valve for returning all fuel in excess of engine requirements from the filter discharge to a thermal control means whenever the fuel flow upstream of the metering means exceeds the requirements of the engine; and wherein the discharge of the thermal control means is in fuel flow communication with the fuel reservoir and the pump means inlet, the thermal control means scheduling a decreasing rate of fuel to the fuel reservoir as a function of decreasing fuel temperature, the remainder being routed to the pump means inlet.

15. The fuel deivery and control system of claim 14 wherein the heat exchange means includes a first heat exchanger downstream of the pump means and a second heat exchanger downstream of the fuel control such that all of the fuel discharged from the pump means passes through the first heat exchanger and all of the metered fuel passes through the second heat exchanger.

16. The fuel delivery and control system of claim 14 wherein the heat exchange means includes a first heat exchanger for receiving the excess pressurized fuel and a second heat exchanger for receiving the metered fuel.

17. The fuel delivery and control system of claim 10 further comprising a second heat exchanger wherein the excess pressurized fuel and a liquid to be cooled are maintained in heat exchange relationship.

18. A fuel delivery system comprising:
a first fuel-oil heat exchanger;
a second fuel-oil heat exchanger in downstream fuel flow communication with said first heat exchanger;
a first oil cooling circuit comprising, in sequential oil flow communication, an oil supply, a first oil-lubricated system, said second heat exchanger, and means for returning the oil to said oil supply; and
a second oil cooling circuit comprising, in sequential oil flow communication, said oil supply, said first heat exchanger, a second oil-lubricated system, said second heat exchanger and said return means.

19. A fuel delivery system comprising:
a first fuel-oil heat exchanger;
a second fuel-oil heat exchanger in downstream fuel flow communication with said first heat exchanger;
a first oil cooling circuit comprising, in sequential oil flow communication, an oil supply, said first heat exchanger, said first oil-lubricated system and means for returning the oil to said oil supply; and
a second oil cooling circuit comprising, in sequential oil flow communication, said oil supply, a second oil-lubricated system, said second heat exchanger and said return means.

20. The fuel delivery and control system of claim 2 further comprising a second heat exchanger in serial fuel flow relationship with said first heat exchanger and two oil cooling circuits, the first circuit comprising, in serial oil flow relationship, an oil supply, said first heat exchanger, a first lubricated system, and means for returning oil to said oil supply, and said second circuit comprising, in serial oil flow relationship, said oil supply, said second heat exchanger, a second oil lubricated system and said means for returning oil to said oil supply.

21. A fuel delivery and control system for use with a gas turbine engine and a fuel reservoir, said system comprising:
pump means communicating with the fuel reservoir for drawing fuel therefrom and pressurizing same;
a fuel control in downstream flow communication with the pump means for receiving fuel therefrom, said fuel control including metering means for scheduling the rate of fuel flow to the engine;
a heat exchanger for receiving all of the metered fuel and further communicating with a source of hot fluid which is maintained in heat exchange relation with the fuel; and
means for returning all fuel in excess of engine requirements back to the fuel reservoir.

* * * * *